Patented Jan. 30, 1923.

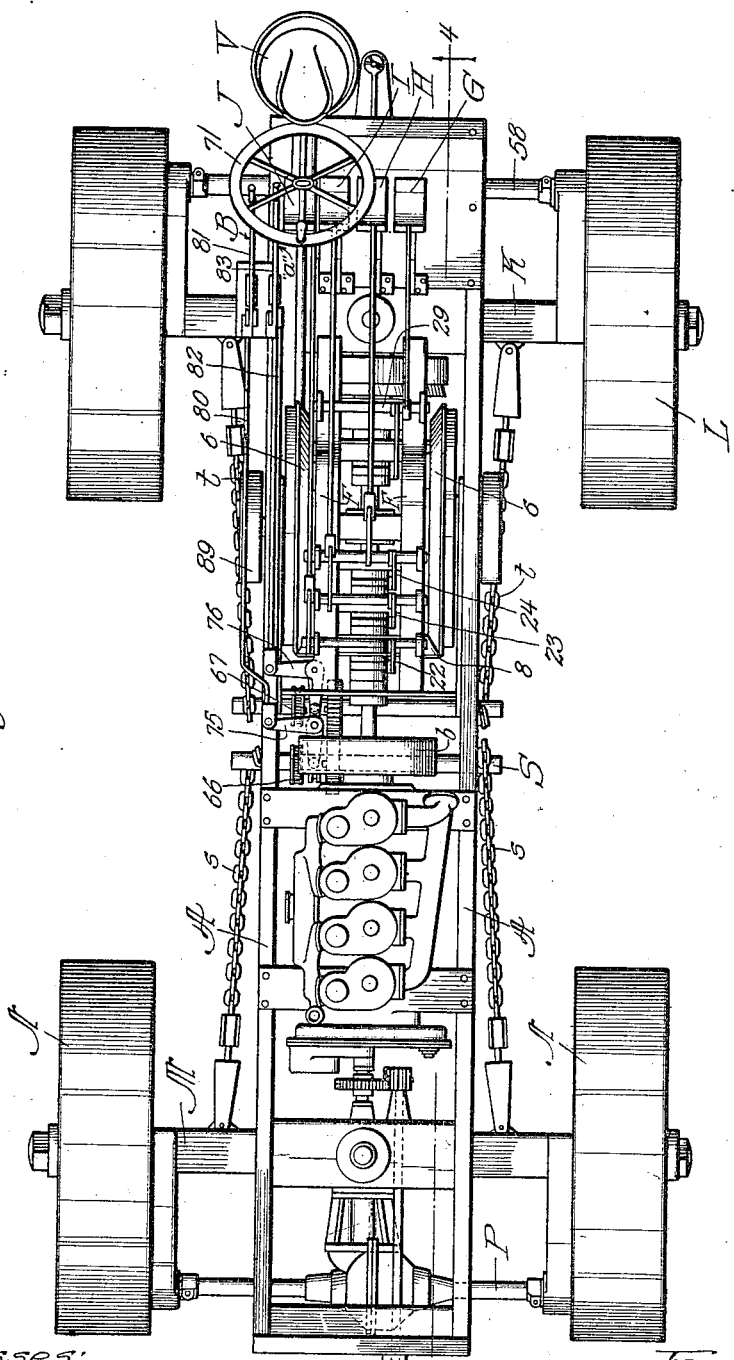

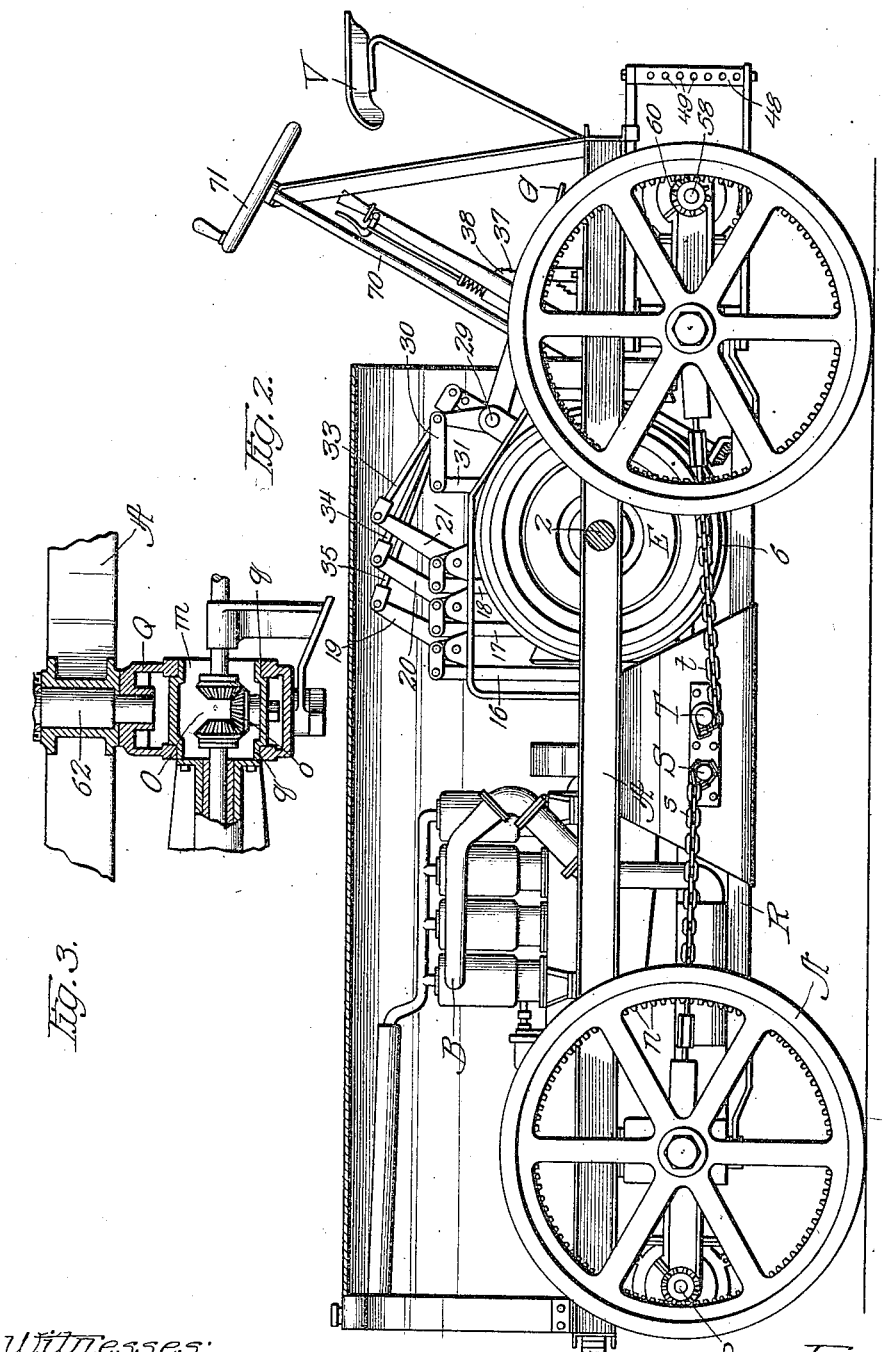

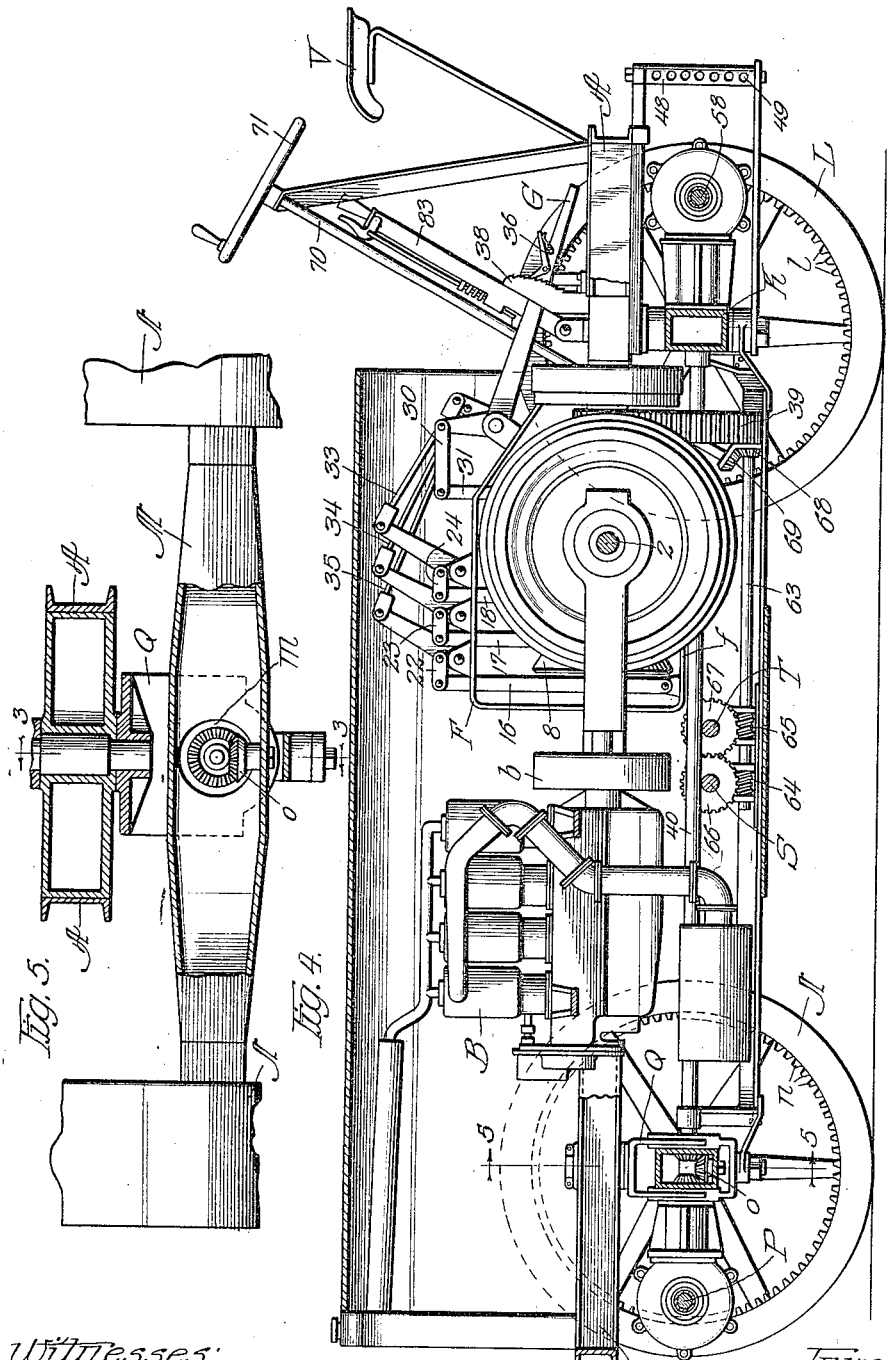

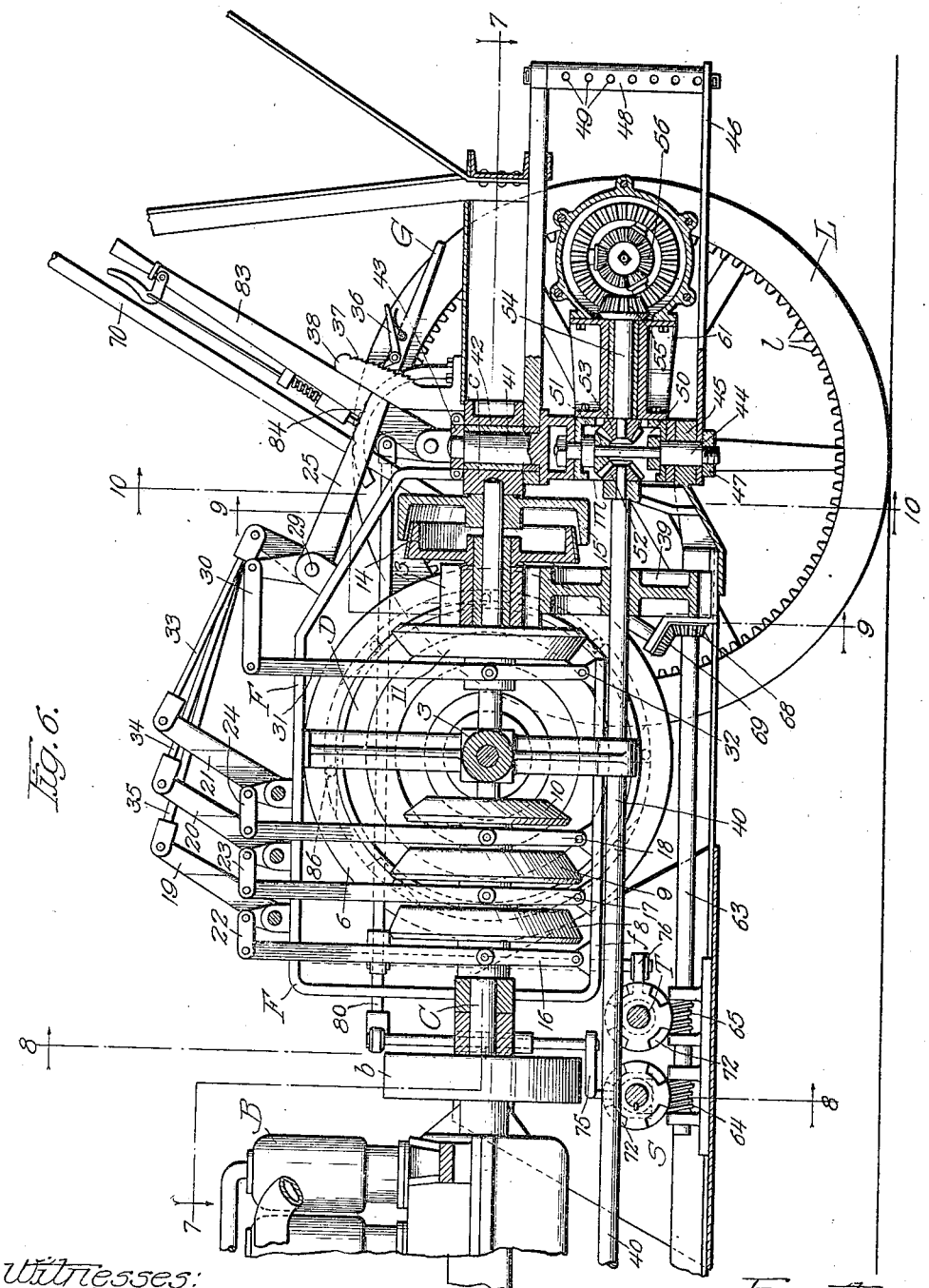

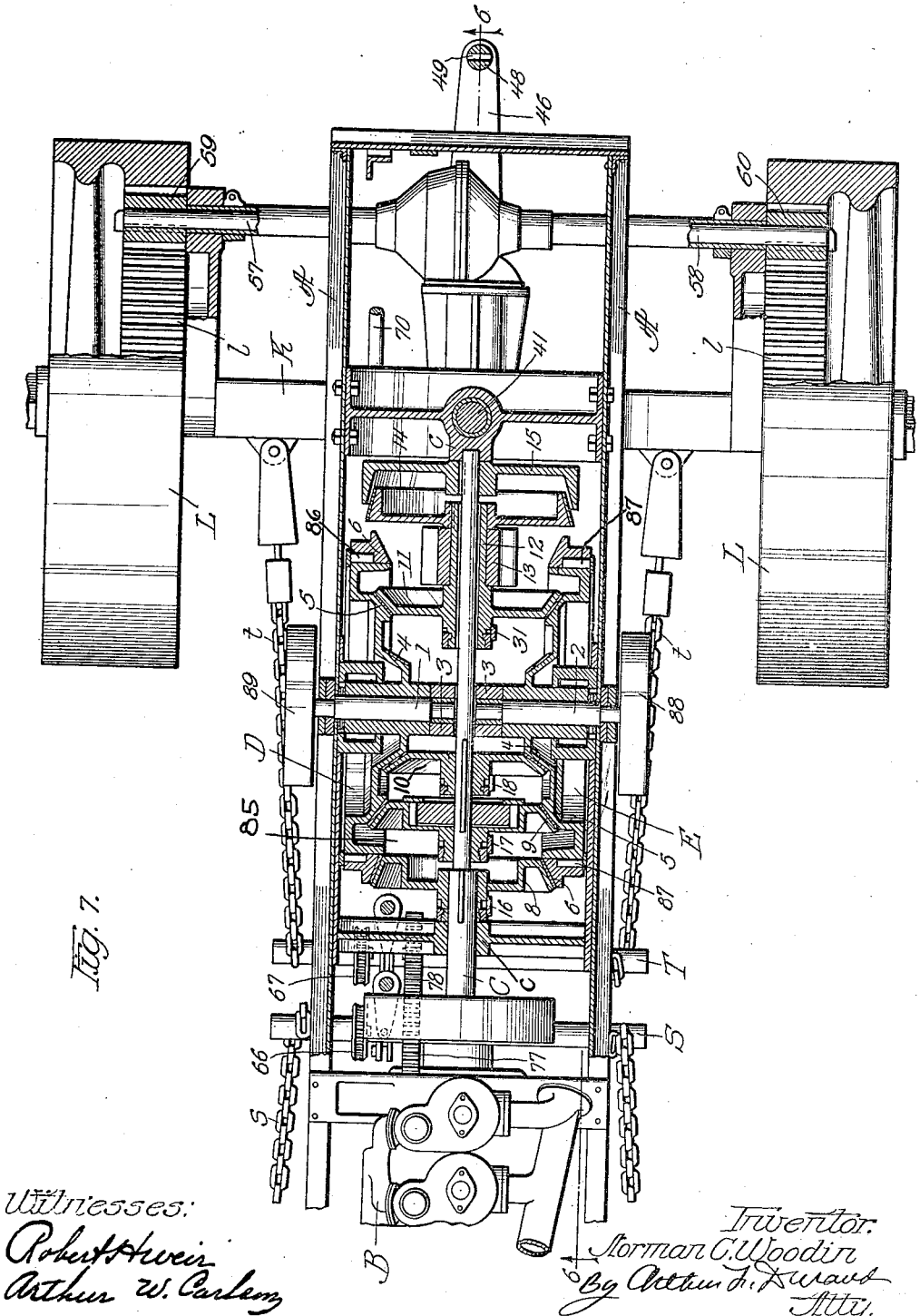

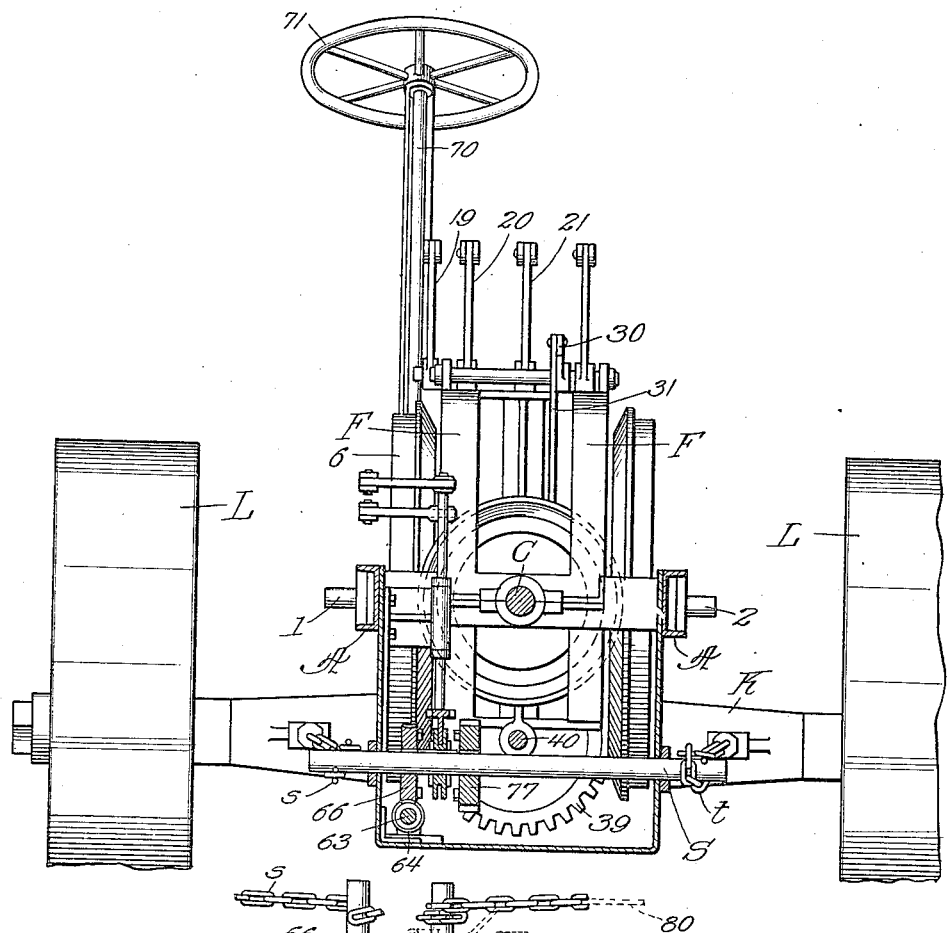
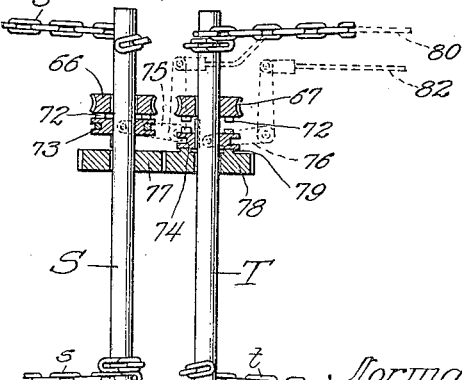

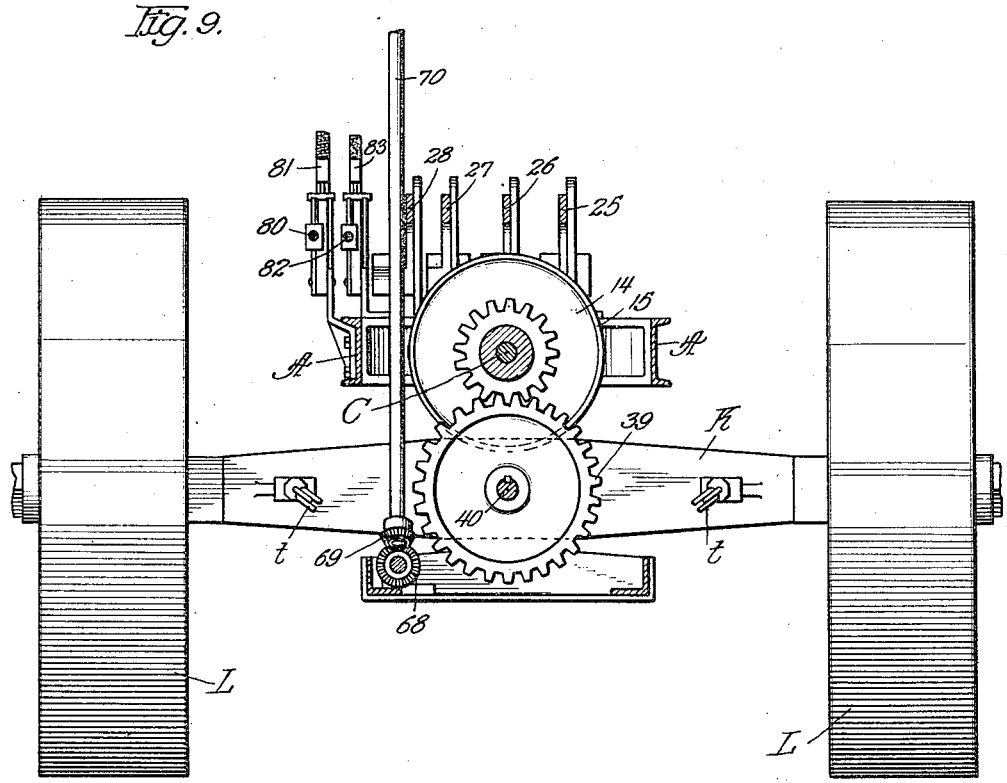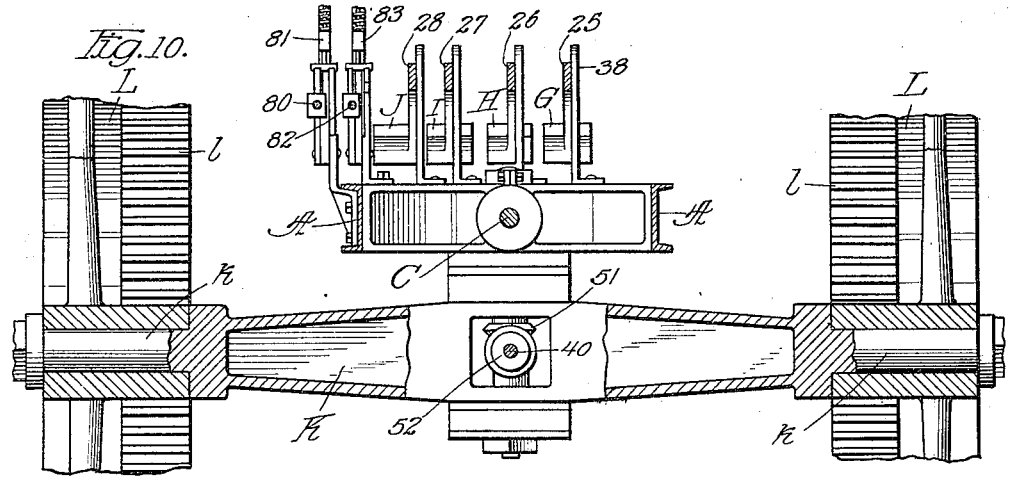

1,443,779

UNITED STATES PATENT OFFICE.

NORMAN C. WOODIN, OF OSHKOSH, WISCONSIN, ASSIGNOR, BY MESNE ASSIGNMENTS, TO F. C. AUSTIN MACHINERY COMPANY, A CORPORATION OF ILLINOIS.

STEERING GEAR.

Original application filed May 18, 1916, Serial No. 98,250. Divided and this application filed October 8, 1917. Serial No. 195,276.

*To all whom it may concern:*

Be it known that I, NORMAN C. WOODIN, a citizen of the United States of America, and resident of Oshkosh, Wisconsin, have invented a certain new and useful Improvement in Steering Gears, of which the following is a specification.

My invention relates to traction-engines, or tractors, as they are commonly called, but more particularly to those which are propelled by internal-combustion-engines, such as an ordinary gasoline-engine, and especially those which are so constructed that all four wheels are suitably connected with the engine, thereby to provide a four-wheel driving-arrangement, and the steering gear being also connected and arranged for controlling both the front and rear wheels.

Generally stated, the object of my invention is to provide an improved and highly efficient tractor of the foregoing general character.

Special objects are to provide an improved construction and arrangement whereby bevel-gears or other devices are employed in the transmission from the engine to the wheels, thereby obviating the necessity of using universal joints in the connection; to provide an improved construction and arrangement whereby a friction-drive-transmission is employed as a substitute for gearing, in a practical and reliable manner, thereby overcoming the difficulties and objections which usually attend the use of gearing; to provide an improved steering-gear-arrangement whereby the four wheels of the tractor are controlled at will to steer the machine to the right or the left, or in such manner that both the front and rear wheels turn in the same direction and travel parallel, thus making it possible to quickly move the tractor bodily in a sidewise direction, as well as to turn it around or steer it to the right or the left; and to provide certain details and features of construction and combinations tending to increase the general efficiency and desirability of a tractor of this particular character.

To these and other useful ends, my invention consists in matters hereinafter set forth and claimed.

In the accompanying drawings:

Fig. 1 is a plan of a tractor embodying the principles of my invention.

Fig. 2 is a side elevation of the said tractor.

Fig. 3 is a detail section on line 3—3 in Fig. 5.

Fig. 4 is a longitudinal section on line 4—4 in Fig. 1.

Fig. 5 is a detail sectional view on line 5—5 in Fig. 4.

Fig. 6 is a longitudinal section on line 6—6 in Fig. 7.

Fig. 7 is a horizontal section on line 7—7 in Fig. 6.

Fig. 8 is a transverse section on line 8—8 in Fig. 6.

Fig. 9 is a vertical section on line 9—9 in Fig. 6.

Fig. 10 is a vertical section on line 10—10 in Fig. 6.

Fig. 11 is an enlarged detail of the steering-gear-mechanism.

As thus illustrated, my invention comprises a horizontal frame A composed, preferably, of channel-iron, or of any other suitable material. Upon this frame, near the forward end thereof, is mounted an engine B, of any suitable character, such as an ordinary four-cylinder, slow-speed, heavy-duty gasoline engine. The said engine has a fly-wheel *b* which is suitably connected with the longitudinally-disposed driving-shaft C, the latter having its forward end-portion mounted in a suitable bearing *c*, or supported in any desired manner. The transverse shafts 1 and 2 are supported in bearings 3, at their ends which are adjacent the shaft C, and are disposed in the horizontal plane of the latter, being provided, respectively, with large bevel-wheels D and E, these wheels being provided with inner and outer and intermediate friction-bevels 4, 5 and 6, of any suitable character. Friction-bevel-wheels 8, 9 and 10 are splined on the shaft C, the wheel 8 being arranged to engage the bevels 6 on the wheels E and D, while the wheel 9 engages the bevels 5 and the wheel 10 engages the bevels 4, in a manner that will be readily understood. The friction-bevel-wheel 11 is loose on the shaft C, being provided with a sleeve 12 which extends through the pinion 13 and which is provided at its end with a splined friction-clutch-member 14 for engaging the other clutch-member 15 which is keyed to the longitudinal driving-shaft C in any suitable manner. The friction-bevel-wheels 8, 9 and 11 are of the same diameter, but the friction-bevel-wheel 10 is of less diameter, preferably, thereby to change the speed in the desired manner. A yoke-like frame F extends over and under the friction-bevel-transmission thus provided, and upon the bottom portion $f$ of this frame are pivoted the upright levers 16, 17 and 18, which are suitably constructed and arranged for shifting the friction-bevel-wheels 8, 9 and 10 on the shaft C when it is desired to change the speed. Bell-crank-levers 19, 20 and 21 are pivotally mounted on the upper portion of the frame F, and are connected by links 22, 23 and 24 with the levers 16, 17 and 18, respectively. Bell-crank-levers 25, 26, 27 and 28 are pivoted on the rear end of the frame F at 29, and the rear ends of these bell-cranks are provided with pedals G, H, I and J, which are within reach of the driver. The bell-crank 25 has its forward end-portion connected by a link 30 with the upper end of the lever 31, which has its lower end pivoted at 32 upon the bottom portion $f$ of the frame F, this lever 31 being suitably constructed and arranged for shifting the friction-bevel-wheel 11 on the shaft C, in a manner that will be readily understood. The bell-cranks 26, 27 and 28 are connected by rods 33, 34 and 35 with the upper ends of the bell-cranks 21, 20 and 19, respectively, whereby operation of the pedals H, I and J will control the friction-bevel-wheels 10, 9 and 8, while operation of the pedal G will control the friction-bevel-wheel 11; and to hold the said pedals in any desired position they are provided with pivoted-dogs 36 for engaging the ratchet-teeth 37 on brackets 38 which are rigidly mounted on the main frame of the machine. The pinion 13 engages a gear-wheel 39 on the longitudinally-disposed shaft 40, which latter is supported in suitable bearings below the frame A, said gear-wheel being keyed or otherwise secured to said shaft.

The rear axle K is of suitable form and construction, having its ends provided with spindles $k$ for the rear driving-wheels L, which latter have internal gear-teeth $l$ at the inner sides thereof. This axle turns or skews about a vertical axis provided by the cylindric portion 41, which extends upward through a suitable bearing 42 on the main frame and is provided at its upper end with a split collar 43. This axis is also formed in part by the cylindric element 44 at the bottom of said axle, which extends through the stationary portion 45, the latter being supported in any suitable manner. The draw-bar 46 is secured to the lower end of the element 44 by a nut 47, or in any suitable manner, and is attached at its end to the vertically-disposed draft-bar 48, the latter being provided with a series of holes 49 for ensuring the desired connection with the plow or other implement, or with anything else which is to be hauled behind the tractor. This axle K is hollow and is provided with a chamber 50 containing an upper idler-bevel-pinion 51 which engages the bevel-gears 52 and 53 on the shafts 40 and 54, the latter having its rear end provided with a bevel-pinion 55 for engaging the differential-gearing 56 at the rear of the axle. This differential-gearing may be of any suitable, known or approved character, and is provided with the two shaft-sections 57 and 58 for the pinions 59 and 60 which engage the teeth $l$ of the rear traction-wheels. The shaft 54 and the differential-gearing 56 are suitably supported by a boxing or housing 61 secured to the rear side of the axle K, so that when the said axle turns about its vertical axis the differential-gearing and its connections to the rear traction-wheels swing or skew in unison about the same axis. The bevel-pinion 51, it will be seen, rotates about the said vertical steering-axis of the axle. The front axle M is also hollow and provided, like said other axle, with spindles upon which are mounted the front traction-wheels N, the latter having internal gear-teeth $n$ like those of the rear wheels. The bevel-gearing O of the front axle is similar to the rear axle, and this is also true of the differential-gearing P, whereby the bevel-gearing and the differential-gearing are practically duplicated at the front and rear ends of the machine, except that the front gearing has a lower pinion $o$ instead of the pinion 51 of the rear gearing. The said front axle M must, however, in addition to skewing about a vertical axis, tilt about a horizontal axis as well, in order that all four wheels may stay on the ground while passing over rough or uneven surfaces. For this purpose, therefore, the front axle is provided with a yoke Q which is supported by the cylindric bosses $q$ on the axle M, and a short shaft extends to the differential-gearing P, which short shaft is similar to the shaft 54 at the rear end of the machine. The lower end of said yoke is suitably connected with the forward end of the frame-member or guard R which extends along the bottom of the machine. With this arrangement, therefore, the front axle M can turn or skew about its vertical axis provided by the cylindric-member 62 which extends upwardly from the top of the yoke I in a suitable bearing on the main frame of the machine. In addition, however, this axle M can tilt about a horizontal axis while the machine is passing over uneven ground. To permit the skewing of the axles, a clearance $m$ is provided in the axles for the shaft 40 and the gearing.

The steering-gear comprises a pair of transverse shafts S and T mounted in suitable bearings below the body-frame. The shaft S has its end portions connected by chains s with the opposite end-portions of the front axle M, said chains being wound in opposite direction upon said shaft. Similar chains t connect the opposite end-portions of the shaft T with the rear axle K, said chains being wound in opposite directions upon said shaft. It will also be observed that the chains s and t at one side of the machine are so wound upon their respective shafts that rotation of the latter in the same direction will wind the two chains thereon; and this is also true of the two chains at the other side of the machine, so that when these two shafts are rotated in one and the same direction the two axles are skewed in opposite directions to steer the machine to the right, and when the two shafts are both rotated in the opposite direction the two axles are then skewed oppositely to steer the machine to the left. The means for rotating the shafts S and T comprises a longitudinally-arranged shaft 63 provided with screws or worms 64 and 65 for engaging, respectively, the worm-wheels 66 and 67 on the shafts S and T, said worm-gearing being adapted to rotate the two shafts in the same direction. At its rear end, the shaft 63 is provided with a bevel pinion 68 for engaging the bevel-gear 69 on the lower end of the steering-shaft 70, which latter is provided at its upper end with a steering-wheel 71 of suitable form and shape. The worm-wheels 66 and 67, in order to further carry out the requirements of my invention, are loose on the shafts S and T (see Fig. 11), and are provided on their inner sides with clutch-teeth 72 for engaging the splined and sliding clutch-members 73 and 74 mounted, respectively, on the shafts S and T, bell-crank-levers 75 and 76 being provided for controlling said clutch-members. The pinion 77 is keyed on the shaft S, while the similar engaging pinion 78 is loose on the shaft T; but the latter pinion is provided with clutch-teeth 79 for engaging the sliding clutch-member 74, which latter is adapted for this purpose. For ordinary steering purposes, the clutch-members 73 and 74 are in engagement with the worm-wheels 66 and 67, so that the two shafts S and T will rotate in the same direction when the steering-wheel is rotated. However, when the clutch-member 74 is shifted into engagement with the pinion 78, leaving the clutch-member 73 in engagement with the worm-wheel 66, the rotation of the steering-wheel will then operate only the worm-wheel 66, but the pinion 77 will rotate the shaft T in the opposite direction through the medium of the pinion 78 which is now locked to the shaft T through the splined-clutch member 74, in a manner which will be readily understood. With the steering-mechanism in this condition, the shafts S and T will rotate in opposite directions, so that the front and rear axles will be skewed in the same direction thereof to the right or to the left, and thus the front and rear wheels will always travel parallel, even when the axles are skewed considerably to one side. In other words, the rear wheels will not track with the front wheels, although traveling parallel therewith, but will travel either to the right or to the left of the front wheels, so that the tractor, in effect, will move bodily in a sidewise direction, which is of considerable advantage when the tractor is being used in the field for various purposes. The bell-crank 75 is connected by a rod 80 with the hand-lever 81, and the similar rod 82 connects the bell-crank 76 with a hand-lever 83, which levers are provided with locking devices for engaging the segments or curved-racks 84 suitably mounted on the body-frame, whereby these two hand-levers can be held in different positions. Either shaft S or T can be rotated alone, by properly manipulating the clutches 73 and 74, as it is obvious that only shaft S will rotate if clutch 74 is in neutral position between wheels 67 and 78, and that only shaft T will rotate if clutch 73 is in a neutral position between the wheels 66 and 77 while the clutch 74 is in engagement with the wheel 67; and in this way either the front axle or the rear axle can be skewed alone and without skewing the other axle, when this is desirable or necessary.

Thus, the hand-levers 81 and 83 at the rear of the tractor are in position to be operated by the driver occupying the seat U to control the clutches of the steering-mechanism, so that the front and rear axles can be skewed in the desired manner. The pedals G, H, I and J are within reach of the said driver, the pedal G being employed for operating the reversing-clutch formed by the two members 14 and 15, and the pedals H, I and J controlling, respectively, the high, intermediate and low speeds of the friction-bevel-transmission through which the power is communicated from the engine to the front and rear traction-wheels. The bevels 8, 9 and 10 are driven at the same speed, and while bevel 10 is of somewhat less diameter than the other, it will be seen that this is more than offset by the small diameter of the bevel 4, so that bevel 10 will drive the idlers D and B at higher speed than they are driven by the bevels 8 or 9. The intermediate speed friction-bevel-wheel 9, has, preferably, a roller-clutch 85 which permits this intermediate speed transmission-connection to remain closed—that is to say, which permits the wheel 9 to remain in engagement with the bevel 5 while the high-speed bevel-wheel 10 is in engagement with the bevel 4, which enables the driver to change quickly from intermediate to high speed without the necessity of manipulating the foot-pedal which controls the intermediate speed. Also, the idler-wheels D and E have roller-clutches 86 and 87 for the bevels 6, so that the latter may each have relative rotation on its wheel in one direction but not in the other. With this arrangement bevel 8 can stay in engagement with bevels 6 after bevel 9 is thrown into engagement with bevels 5. Also, bevels 8 and 9 can stay in engagement when bevel 10 is shifted into engagement with bevels 4 on said idler-wheels. Thus, the transmission can be changed from low to intermediate without opening low, and to high without opening either of the other speed transmissions. These roller-clutches can, of course, be of any suitable character, and are well known.

With the idler-bevels 51 and O arranged as shown, the torque of the shaft 40 is balanced on the steering gear, when the latter is in condition to skew the axles in opposite directions, thus making the machine steer as easily to the right as to the left.

Pulleys 88 and 89 are secured to the outer ends of the shafts 2 and 1 and, as they run in opposite directions, are available for driving various kinds of machinery, the clutch (14 and 15) being open at such time, and the bevel 11 being out of engagement with the bevels 5 on the idlers.

It will be seen that this is a division of my prior application No. 98,250, filed May 18, 1916, for tractor. In said prior application, division was required by the Patent Office between "driving mechanism" and "steering gear", and in compliance with such requirement I have elected to claim the driving mechanism and power-transmitting devices in said prior or parent application, while in this divisional application I have claimed the steering gear and certain combinations involving steering gear.

What I claim as my invention is:—

1. In a tractor, front and rear steering wheels, devices comprising a single steering hand-wheel and a pair of transverse rotatable drum shafts gear-connected with each other and with said hand wheel for controlling all of said wheels to steer the tractor, mechanism co-operating with said devices to keep the front and rear wheels parallel and cause bodily sidewise movement of the tractor when the wheels are turned in either direction, and means to control said mechanism.

2. In a tractor, a structure as specified in claim 1, said devices including worm-gearing, and said mechanism including gears and clutches on said shaft to vary the control over said front and rear wheels.

3. In a tractor, a structure as specified in claim 1, said mechanism having means on said shafts whereby steering control may be exercised over the front wheels alone.

4. In a tractor, a structure as specified in claim 1, said wheels having pivoted axles which are skewed in opposite directions to steer the tractor and which skew in the same direction to produce said sidewise movement of the tractor.

5. In a tractor, a structure as specified in claim 1, and means to drive all of said front and rear wheels.

6. In a tractor, a structure as specified in claim 1, said mechanism having means on said shafts whereby steering control may be exercised over the rear wheels alone.

7. In a tractor, the combination of front and rear axles, traction wheels on said axles, a prime mover, power-transmitting devices between said prime mover and all of said wheels, means including gear-rotated drum shafts whereby said axles may be skewed to steer the tractor, and steering gear suitably connected to control said axles, said steering gear comprising (1) means whereby the front axle may be controlled alone, (2) means whereby the rear axle may be controlled alone, (3) means whereby the front and rear axles may be skewed together in opposite directions, (4) means whereby the two axles may be skewed together in the same direction, and (5) a single steering hand-wheel to control the steering gear, in combination with (6) means to control said steering gear to enable said steering wheel to exercise the desired control over said axles.

8. In a tractor, the combination of front steering wheels, rear steering wheels, steering gear connections extending forward to control said front wheels, steering gear connections extending rearward to control said rear wheels, a single steering hand-wheel and means including rotatable drum shafts at the middle of the tractor for controlling all of said connections, a prime mover, power-transmitting devices through which the front wheels are operated by the prime mover, and power-transmitting devices through which the rear wheels are operated by said prime mover.

9. In a tractor, the combination of front steering wheels, rear steering wheels, a prime mover, power-transmitting devices through which power is communicated from the prime mover to one or more of said wheels, steering gear connections to the front wheels, steering gear connections to the rear wheels, and a single steering hand-wheel and means including rotatable drum-shafts and gearing operated by said hand-wheel between the front and rear connections to control all of said connections.

10. In a tractor, the combination of a plurality of pairs of traction wheels, power-transmitting devices for operating all of said wheels, said pairs being disposed one ahead of the other, and steering gear mechanism including a single steering hand-wheel and means including rotatable drum-shafts and gearing operated by said hand wheel to control all of said wheels together, or to control the different pairs independently of each other, and means to control said mechanism to enable said hand-wheel to exercise the desired control over said traction wheels.

Signed by me at Chicago, Ill., this 15th day of Sept. 1917.

NORMAN C. WOODIN.